United States Patent
Velu

(10) Patent No.: US 10,278,230 B2
(45) Date of Patent: Apr. 30, 2019

(54) METHODS, SYSTEMS, AND MEDIA FOR MANAGING NETWORK CONNECTIONS

(71) Applicant: Google LLC, Mountain View, CA (US)

(72) Inventor: Kamesh Raj Velu, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/245,789

(22) Filed: Aug. 24, 2016

(65) Prior Publication Data

US 2018/0063758 A1    Mar. 1, 2018

(51) Int. Cl.
| | |
|---|---|
| *H04W 36/06* | (2009.01) |
| *H04W 48/16* | (2009.01) |
| *H04W 76/23* | (2018.01) |
| *H04W 36/08* | (2009.01) |
| *H04W 84/12* | (2009.01) |

(52) U.S. Cl.
CPC ........... *H04W 76/23* (2018.02); *H04W 36/06* (2013.01); *H04W 48/16* (2013.01); *H04W 36/08* (2013.01); *H04W 84/12* (2013.01)

(58) Field of Classification Search
CPC ..... H04W 84/12; H04W 36/30; H04W 36/36; H04W 36/0088; H04W 36/06; H04W 36/08
See application file for complete search history.

(56) References Cited

U.S. PATENT DOCUMENTS

| | | | |
|---|---|---|---|
| 2006/0025128 A1* | 2/2006 | Lee | H04W 36/0083 455/432.1 |
| 2006/0135068 A1 | 6/2006 | Jaakkola et al. | |
| 2008/0207246 A1* | 8/2008 | Shanbhag | H04W 36/30 455/522 |
| 2014/0059218 A1 | 2/2014 | Ganu et al. | |
| 2014/0071919 A1* | 3/2014 | Kitazoe | H04W 72/1268 370/329 |
| 2015/0341233 A1* | 11/2015 | Marri Sridhar | H04W 4/70 370/252 |
| 2016/0227544 A1* | 8/2016 | Katar | H04W 48/16 |
| 2017/0251400 A1* | 8/2017 | Jha | H04W 28/06 |

\* cited by examiner

*Primary Examiner* — Nam T Huynh
(74) *Attorney, Agent, or Firm* — Byrne Poh LLP

(57) ABSTRACT

Methods, systems, and media for controlling network connections are provided. In some implementations, a method for controlling network connections is provided, the method comprising: determining, by a user device connection to an access point by a first network connection, that a second network connection is available; determining that the user device is in an idle state; while the user device is in the idle state, switching from the first network connection to the second network connection; monitoring network activity using the second network connection; switching back to the first network connection; generating a profile for the second network connection based at least in part on the monitored network activity; comparing the profile for the second network connection to a profile for the first network connection; selecting the second network connection based on the comparison; and in response to selecting the second network connection, switching to the second network connection.

18 Claims, 3 Drawing Sheets

METHODS, SYSTEMS, AND MEDIA FOR MANAGING NETWORK CONNECTIONS

TECHNICAL FIELD

The disclosed subject matter relates to methods, systems, and media for managing network connections.

BACKGROUND

As the number devices that connect to the Internet through wireless networks has exploded in recent years, wireless networks have become increasingly crowded and less reliable. One relatively recent development to attempt to address some of these issues is the introduction of dual-band wireless access points that can connect to devices in the five gigahertz (5 GHz) band in addition to the 2.4 GHz band connections available in many older wireless access points. However, connections at 5 GHz present other issues. For example, certain channels used by 5 GHz systems overlap with frequencies used by certain radar systems and may be required (e.g., due to government regulations) to use dynamic frequency selection (DFS) to switch to another channel when radar interference is detected. This requires all of the devices connected to the access point at 5 GHz to also switch to the new channel, which can result in decreased reliability, especially when many devices are connected and all have to acquire signals at the new channel simultaneously.

Accordingly, it is desirable to provide new methods, systems, and media for managing network connections.

SUMMARY

In accordance with various implementations of the disclosed subject matter, methods, systems, and media for managing network connections are provided.

In accordance with some implementations of the disclosure subject matter, a method for managing network connections is provided, the method comprising: connecting, by a user device, to an access point using a first network connection; determining that a second network connection is available; determining that the user device is in an idle state; while the user device is in the idle state, switching from the first network connection to the second network connection; monitoring network activity using the second network connection; subsequent to monitoring the network activity using the second network connection, switching back to the first network connection; generating a profile for the second network connection based at least in part on the monitored network activity; comparing the profile for the second network connection to a profile for the first network connection; selecting the second network connection based on the comparison; and in response to selecting the second network connection, switching to the second network connection.

In accordance with some implementations of the disclosed subject matter, a system for managing network connections is provided, the system comprising: a user device comprising a hardware processor that is programmed to: connect to an access point using a first network connection; determine that a second network connection is available; determine that the user device is in an idle state; while the user device is in the idle state, switch from the first network connection to the second network connection; monitor network activity using the second network connection; subsequent to monitoring the network activity using the second network connection, switch back to the first network connection; generate a profile for the second network connection based at least in part on the monitored network activity; compare the profile for the second network connection to a profile for the first network connection; select the second network connection based on the comparison; and in response to selecting the second network connection, switch to the second network connection.

In accordance with some implementations of the disclosed subject matter, a non-transitory computer-readable medium containing computer executable instructions that, when executed by a processor, cause the processor to perform a method for managing network connections is provided, the method comprising: connecting, by a user device, to an access point using a first network connection; determining that the user device is in an idle state; while the user device is in the idle state, switching from the first network connection to the second network connection; monitoring network activity using the second network connection; subsequent to monitoring the network activity using the second network connection, switching back to the first network connection; generating a profile for the second network connection based at least in part on the monitored network activity; comparing the profile for the second network connection to a profile for the first network connection; selecting the second network connection based on the comparison; and in response to selecting the second network connection, switching to the second network connection.

In accordance with some implementations of the disclosed subject matter, a system for managing network connections is provided, the system comprising: means for connecting a user device to an access point using a first network connection; means for determining that the user device is in an idle state; means for switching, while the user device is in the idle state, from the first network connection to the second network connection; means for monitoring network activity using the second network connection; means for switching, subsequent to monitoring the network activity using the second network connection, back to the first network connection; means for generating a profile for the second network connection based at least in part on the monitored network activity; means for comparing the profile for the second network connection to a profile for the first network connection; means for selecting the second network connection based on the comparison; and means, responsive to the means for selecting the second network connection, for switching to the second network connection.

In some implementations, the access point is a dual-band access point, and the first network connection uses a first frequency band to connect to the access point and the second network connection uses a second frequency band to connect to the access point.

In some implementations, the first frequency band operates at about 2.4 GHz and the second frequency band operates at about 5 GHz.

In some implementations, the second network connection connects to a second access point.

In some implementations, the means for monitoring network activity comprises means for monitoring the number of other user devices connected to the same access point using a network connection corresponding to the second network connection.

In some implementations, the means for monitoring network activity comprises means for monitoring for channel changes.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms (which can include methods, systems, and/or media) for managing network connections are provided.

In some implementations, the mechanisms described herein can preferentially connect to an access point and/or using a particular frequency band that the mechanisms have determined to be more reliable and/or to provide better network performance among available network connections. In some implementations, the mechanisms described herein can determine whether another network connection is available. For example, a user device, such as a media receiving device that is configured to receive media content over the Internet and output the received content to a television for presentation to a user, executing the mechanisms described herein can search for networks to which the media receiving device can potentially connect. In such an example, the media receiving device can determine that there is another network with the same service set identifier (SSID) as the network to which the media receiving device is currently connected (sometimes referred to herein as the home network connection or home network), but that operates at a different frequency band.

In some implementations, the mechanisms described herein can monitor one or more alternate network connections when the user device executing the mechanisms described herein is idle. For example, when the media receiving device is not being used to download and output media content, the mechanisms described herein can establish an alternate network connection (e.g., a 5 GHz connection instead of a currently used 2.4 GHz connection) and monitor aspects of the connection and/or the wireless network to which the alternate network connection is established.

In some implementations, the mechanisms described herein can determine whether the current network connection or the alternate network connection is likely to be more reliable based on the information obtained through monitoring the network activity using the alternate connection. For example, the media receiving device can compare the current networks performance and/or reliability to the alternate networks performance and/or reliability. In such an example, the media receiving device can select the network with better performance, and use a connection to that network for downloading media content in the future.

Figure 1:
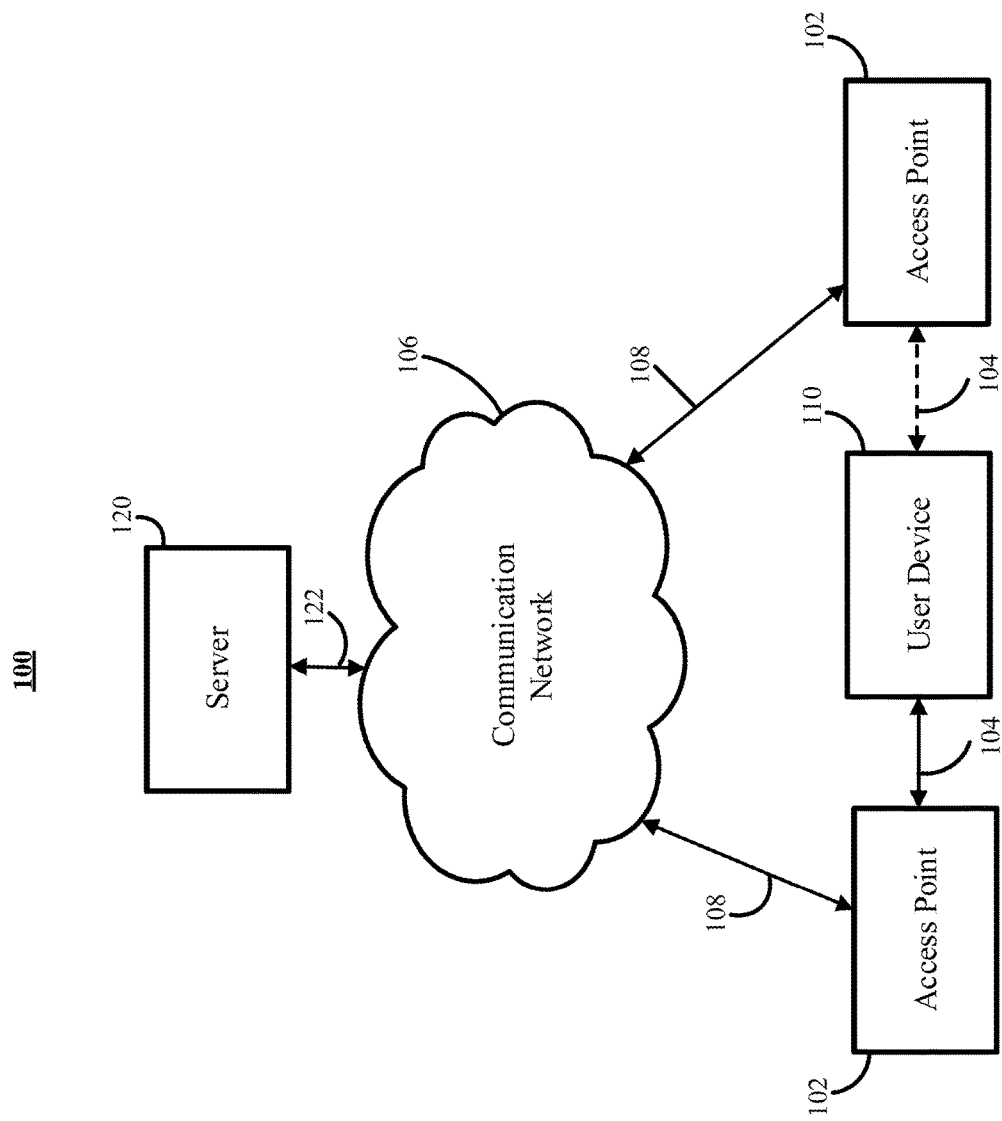
FIG. 1 shows an example of a generalized schematic diagram of a system on which the mechanisms for managing network connections as described herein can be implemented in accordance with some implementations of the disclosed subject matter.

FIG. 1 shows an example 100 of a generalized schematic diagram of a system on which the mechanisms for managing network connections as described herein can be implemented in accordance with some implementations of the disclosed subject matter. As illustrated, system 100 can include one or more user devices 110. User devices 110 can be local to each other or remote from each other. User device 110 can be connected to an access point 102 via a communications link 104, which can in turn be connected to a communication network 106 via a communications link 108.

System 100 can include one or more servers 120 which can be connected to communication network 106 via a communications link 122. Server 120 can be any suitable server or servers for providing access to any suitable information, such as a processor, a computer, a data processing device, or any suitable combination of such devices.

In some implementations, each of user devices 110, access point 102 and server 120 can be any of a general purpose device such as a computer or a special purpose device such as a client, a server, a wireless access point, a router, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a smartphone, a tablet computer, a mobile telephone, a wearable computer, a vehicle (e.g., an automobile, a boat, an airplane, or any other suitable vehicle) entertainment system (e.g., a radio, a built-in display, etc.), a personal computer, a laptop computer, a digital media receiver, a set-top box, a smart television, a home entertainment system, a game console, any other suitable computing device, or any suitable combination thereof. As another example, access point 102 can be implemented as any suitable wireless access point such as a wireless access point configured to communicate with one or more user devices using one or more wireless communication techniques that comply with one or more of the IEEE 802.11 group of wireless communication standards, which are sometimes referred to herein as Wi-Fi.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. In some implementations, communications link 104 can be any communications link suitable for communicating data between user device 110 and access point 102, such as a 2.4 gigahertz (GHz) Wi-Fi link, a 5 GHz Wi-Fi link, a ZigBee link, etc. Each of communications links 108 and 120 can be any communications links suitable for communicating data among user devices access points 102 and server 110, such as network links, dial-up links, wireless links, hard-wired links, any other suitable communications links, or any suitable combination of such links. Note that, in some implementations, a user device (e.g., user device 110) can be configured to have access to multiple access points 102 and/or to multiple frequency bands provided by the same access point 102. In some implementations, network connections provided by different access points 102 and/or network connections provided over different frequency bands can have different identifying information (e.g., different Service Set Identifiers (SSIDs)) or the same identifying information (e.g., in the case of a network configuration having multiple access points that provide access to the same local area network, such as a wireless mesh network).

Figure 2:
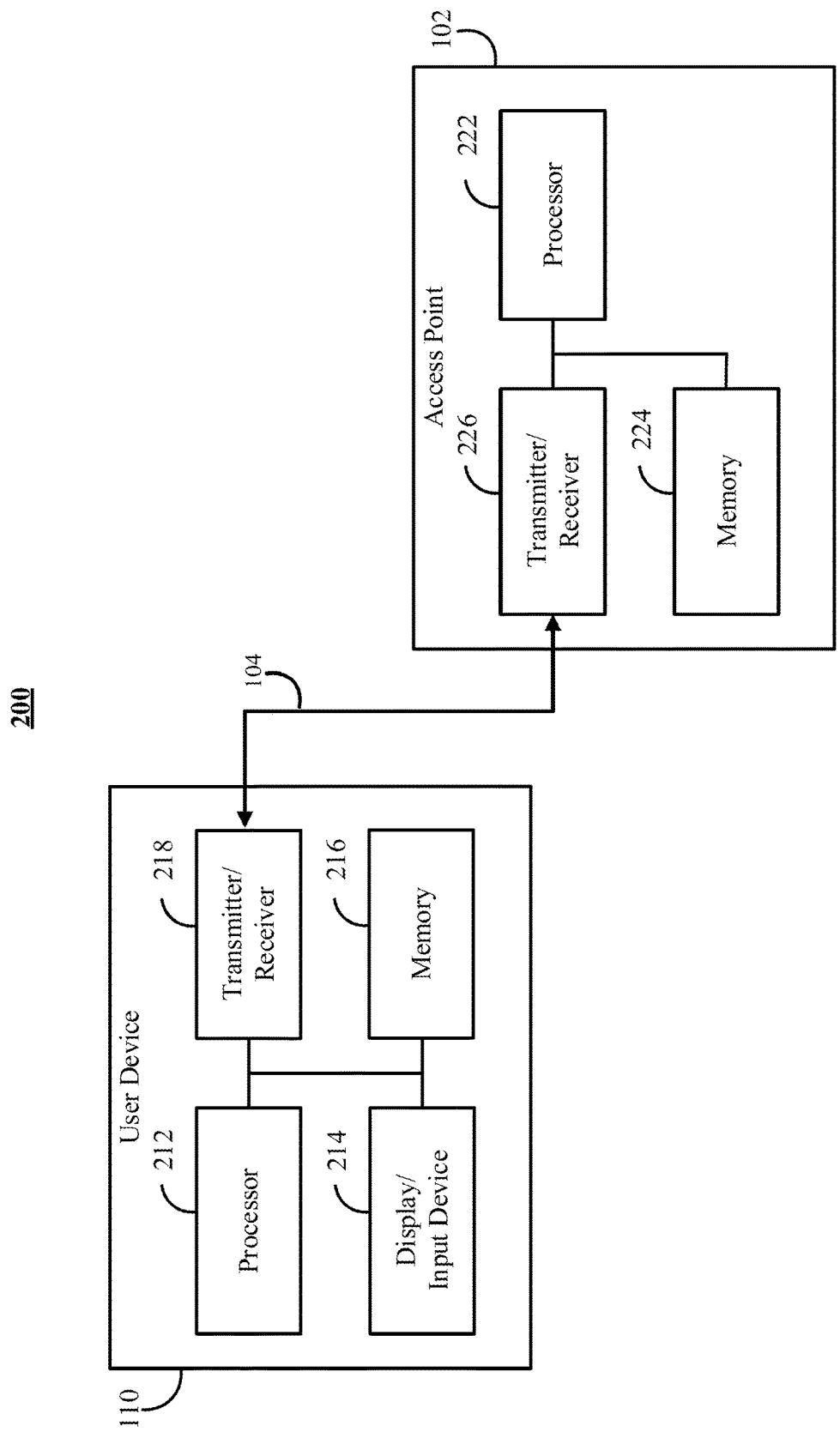
FIG. 2 shows an example of hardware that can be used to implement one or more user devices and access points depicted in FIG. 1 in accordance with some implementations of the disclosed subject matter.

FIG. 2 shows an example 200 of hardware that can be used to implement one or more of user devices 110, and access points 102 depicted in FIG. 1 in accordance with some implementations of the disclosed subject matter. Referring to FIG. 2, user device 110 can include a hardware processor 212, a display/input device 214, memory 216, and a transmitter/receiver 218, which can be interconnected. In some implementations, memory 216 can include a storage device (such as a non-transitory computer-readable medium) for storing a computer program for controlling hardware processor 212.

Hardware processor 212 can use the computer program to establish connections to various access points (e.g., access points 102), monitor activity by the access point, profile the network connection, etc. It should also be noted that data received through communications link 104 or any other communications links can be received from any suitable source. In some implementations, hardware processor 212 can send and receive data through communications link 104 or any other communication links using, for example, a transmitter, receiver, transmitter/receiver, transceiver, or any other suitable communication device, such as transmitter/receiver 218. Display/input device 214 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 218 can include any suitable transmitter and/or receiver for transmitting and/or receiving any suitable data, such as data sent to server 120 by user device 110 and/or sent from server 120 to user device 110. In some implementations, transmitter/receiver 218 can include any suitable number and/or type of transmitter, receiver, transmitter/receiver, transceiver, etc.

Access point 102 can include a hardware processor 222, memory 224, and a transmitter/receiver 226, which can be interconnected. In some implementations, memory 224 can include a storage device (such as a non-transitory computer-readable medium) for storing a computer program for controlling hardware processor 222.

Hardware processor 222 can use the computer program to establish network connections with one or more user devices 110, communicate with other access points 102 and/or with a communications network (e.g., communications network 106), and/or to perform any other suitable functions. It should also be noted that data received through communications link 104, communications link 108 and/or any other communications links can be received from any suitable source. In some implementations, hardware processor 222 can send and receive data through communications link 104, communications link 108 and/or any other communication links using, for example, a transmitter, receiver, transmitter/receiver, transceiver, or any other suitable communication device, such as transmitter/receiver 226. Transmitter/receiver 226 can include any suitable number and/or type of transmitter, receiver, transmitter/receiver, transceiver, etc., for transmitting and/or receiving any suitable data, such as data sent to server 120 by user device 110 and/or sent from server 120 to user device 110. In some implementations, access point 102 can include one or more other transmitters and/or receivers (not shown) that can be used to communicate with, for example, communications network 106 using communications link 108.

Figure 3:
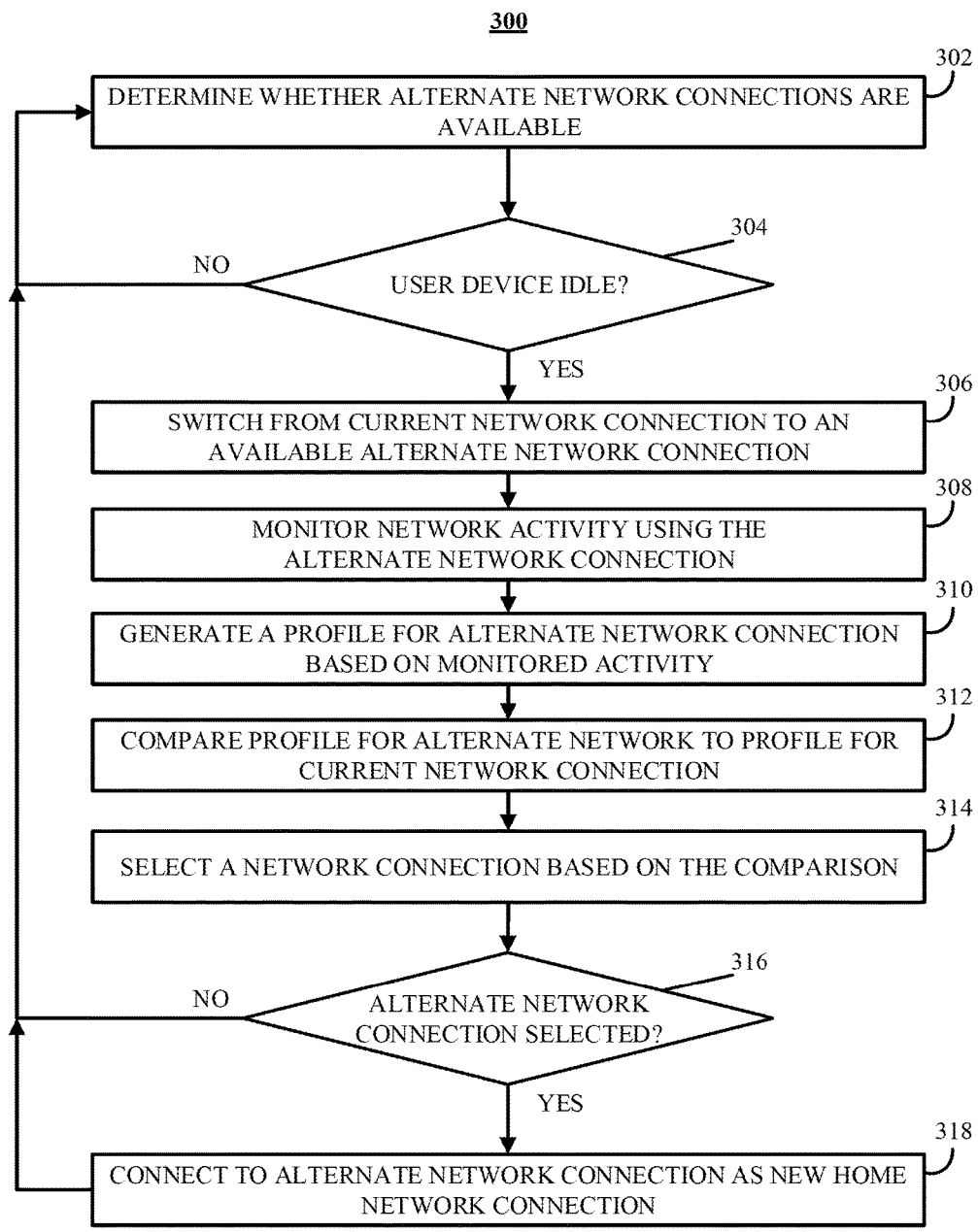
FIG. 3 shows an example of a process for managing network connections in accordance with some implementations of the disclosed subject matter.

Turning to FIG. 3, an example 300 of a process for managing network connections is shown in accordance with some implementations of the disclosed subject matter. At 302, process 300 can determine whether a network connection other than a current network connection is available to be used by a user device (e.g., user device 110) that is executing at least a portion of process 300. In some implementations, process 300 can use any suitable technique or combination of techniques to determine whether an alternative network connection is available. For example, process 300 can periodically identify network connections that are potentially available. In a more particular example, process 300 can send a request (e.g., addressed to any discoverable access point) for identifying information of access points that are compatible with a wireless communication standard being used by user device 110 (e.g., over a particular channel). In such an example, process 300 can receive responses to the request that include identifying information (e.g., the SSID associated with the network connection over which the access point is responding) and any other suitable information about the network connection such as whether the network connection is secured, identifying information of the access point (e.g., a media access control (MAC) address, an organizationally unique identifier (OUI) portion of the MAC address, a network interface controller (NIC) portion of the MAC address, etc.). In some implementations, process 300 can send such a request over multiple channels and/or multiple frequency bands (e.g., the 2.4 Ghz band and the 5 Ghz band).

As another example, process 300 can periodically identify network connections to which the user device (e.g., user device 110) executing process 300 has previously connected and/or for which user device 110 has saved the login credentials (e.g., the SSID and password). In such an example, user device 110 can send requests specifically addressed to access points which are hidden (e.g., that do not responds to requests for identifying information addressed to all access points).

In some implementations, process 300 can identify multiple access points and/or network connections that respond with the same SSID. For example, in a wireless mesh network configuration multiple access points may use the same SSID to provide access to the same communication network (e.g., a local area network) across an area that may not be coverable by a single access point (e.g., a college campus, an airport terminal, a hotel, a large residence, etc.). As another example, an access point may provide network connections using the same SSID on different frequency bands.

In some implementations, process 300 can determine that there is an alternate network connection at 302 in situations in which a current network connection and another network connection have the same SSID and/or correspond to connections to the same access point at different frequency bands.

In some implementations, process 300 may not identify an existing different network connection as an available alternate network connection if it does not correspond to the current network connection (e.g., does not share the same SSID, does not correspond to a connection to the same access point using a different frequency band, etc.). Additionally, in some implementations, process 300 may not identify an existing different network connection as an available alternate network connection if is not secure and/or if it is not a network connection to which user device 110 has previously connected (e.g., user device 110 does not have a saved profile for the network connection).

At 304, process 300 can determine if the user device (e.g., user device 110) executing process 300 is in an idle state. In some implementations, process 300 can determine if user device 110 is in an idle state using any suitable technique or combination of techniques. For example, process 300 can determine that user device 110 is in an idle state if process 300 determines that user device 110 is in a sleep state. As another example, process 300 can determine that user device 110 is not in an idle state if user device 110 is currently uploading and/or downloading one or more files.

If process 300 determines that the user device executing process 300 is not in an idle state ("NO" at 304), process 300 can return to 302 and determine whether alternate network connections are available at a suitable time. Otherwise, if process 300 determines that the user device executing process 300 is in an idle state ("YES" at 304), process 300 can proceed to 306.

At 306, process 300 can switch from the current network connection to one of the available alternate network connections. In some implementations, process 300 can switch to any suitable alternate network connection at any suitable time while a user device (e.g., user device 110) is in an idle state. For example, if user device 110 is currently connected to an access point (e.g., access point 102) using a network connection in the 2.4 Ghz frequency band, process 300 can switch to connect to access point 102 using a network connection in the 5 Ghz band. As another example, if user device 110 is currently connected to an access point in a wireless mesh network, process 300 can switch to connect to another access point in the wireless mesh network (e.g., an access point with a next highest signal strength if user device 110 is currently connected to an access point with a highest signal strength).

At 308, process 300 can monitor network activity using the alternate network connection. In some implementations, process 300 can monitor any suitable activity for any suitable period of time. For example, in some implementations, process 300 can monitor the number of retries that occur when connected using the alternate network connection. As another example, process 300 can monitor the signal-to-noise ratio of the alternate network connection. As yet another example, process 300 can monitor whether the access point changes channels for the alternate network connection and/or can monitor the channel being used for the alternate network connection. As still another example, process 300 can determine whether the access point reports that the network is busy and/or that a connection cannot be established to the access point. As a further example, process 300 can monitor the number and/or identifying information of other devices connected to the access point using a network connection corresponding to the alternate network connection. As another further example, process 300 can monitor the signal strength of the alternate network connection. As a still further example, process 300 can test the upload and/or download bandwidth of the alternate network connection. Additionally, process 300 can monitor any other suitable parameters of the alternate network connection.

In some implementations, process 300 can monitor network activity using the alternate network connection for any suitable period of time. For example, if the access point to which user device 110 is connected to using the alternate network connection sends a beacon signal every one hundred milliseconds (ms), process 300 can monitor the alternate network for a period of at least a few multiples of the beacon interval to capture interactions that take place over at least one entire interval between beacon signals. In a more particular example, process 300 can monitor the alternate network connection for 300 ms, 400 ms, etc.

In some implementations, after monitoring network activity using the alternate network connection, process 300 can switch back to the current network connection or can switch to another alternate network connection. Additionally, in some implementations, process 300 can monitor network activity using the current network connection as described above in connection with monitoring network activity using the alternate network connection.

At 310, process 300 can generate a profile for the alternate network connection based on the monitored activity. In some implementations, where a profile already exists for the alternate network connection, process 300 can update the profile based on the monitored activity. In some implementations, process 300 can use any suitable technique or combination of techniques to build the profile. For example, process 300 can determine whether the observed retry rate is relatively high, relatively average, etc. In some implementations, process 300 can generate the profile for the alternate network connection in comparison to values observed on the current network connection. In some implementations, the profile generated by process 300 at 310 can be a profile for a particular time of day and/or day of the week, and process 300 can generate different profile information for different times and/or days to account for different network usage that may occur throughout the day and/or on different days. For example, during the week, a home network may not experience much traffic if no users are home actively using user devices, and accordingly a profile generated using the information from during the day on a Monday may not accurately reflect conditions that would occur on Monday night or during the day on Sunday.

In some implementations, process 300 can generate and/or update the profile based on data collected from multiple samplings throughout a particular period of time (e.g., at least one minute, at least one hour, at least eight hours, etc.).

In some implementations, when new data is collected at 308, some older data that was previously used to generate the profile for the alternate network connection can be replaced, deleted and/or otherwise not used in the current profile. Additionally, in some implementations, process 300 can generate a profile for the current network connection based on information collected about the current network.

In some implementations, process 300 can wait until there is sufficient data to generate the profile at 310. For example, process 300 can wait for network activity over a particular network connection to be monitored at least a threshold number of times before generating the profile at 310. Additionally, in some implementations, process 300 can check the information obtained through the monitoring at 310 for consistency prior to generating the profile at 310. For example, if the information obtained through monitoring over multiple sampling periods is not sufficiently consistent, process 300 can wait for more information, and/or can generate a profile for a particular time and/or day for which consistent information does exist.

At 312, process 300 can compare the profile for the current network connection and the profile for the alternate network connection. In some implementations, process 300 can use any suitable technique or combination of techniques to compare the profiles. For example, the information used to generate each profile can be used to generate one or more scores that represent the reliability and/or performance of each network based on the information gathered as described above in connection with 308, and process 300 can compare the score(s) for each network connection. As another example, process 300 can compare the profiles along multiple dimensions (e.g., number of retries, number of devices connected to the network, bandwidth to a remote server over the network, etc.), and based on the comparison, select a network connection that has the best performance along the most dimensions. As yet another example, process 300 can use the profiles as inputs to a model of network connection performance that can output an indication of which network connection is likely to be more reliable based on the profile information.

At 314, process 300 can select a network connection based on the comparison at 312. In some implementations, process 300 can use any suitable technique or combination of techniques to select a network connection. For example, process 300 can select a network connection monitored at 300 based on the comparison indicating that the alternate network connection is likely to have better performance. In some implementations, process 300 can specify which network connection and/or which access point is being selected. For example, process 300 can specify that a particular type of connection (e.g., a connection in the 2.4 GHz frequency band) to a particular access point (e.g., specified by SSID and/or at least a portion of MAC address) has been selected.

At 316, process 300 can determine whether an alternate network connection has been selected. In some implementations, process 300 can determine, based on the selected network connection, whether an alternate network connection has been selected by comparing the selected network connection (e.g., frequency band, SSID, MAC address, etc.) to the current network connection. If process 300 determines that an alternate network connection has not been selected ("NO" at 316), process 300 can return to 302 and determine whether alternate connections are available. Otherwise, if process 300 determines that an alternate network connection has been selected ("YES" at 316), process 300 can proceed to 318.

At 318, process 300 can cause the user device (e.g., user device 110) executing process 300 to establish a connection to an access point (e.g., access point 102) using the alternate network connection selected at 314. In some implementations, user device 110 can use any suitable technique or combination of techniques to connect to the access point using the network connection selected at 314.

After the alternate network connection is established at 318, process 300 can return to 302 and determine whether any alternate network connections are available, treating the network connection made at 318 as the current network connection.

In some implementations, the network connection that was switched away from at 318 can be blacklisted or otherwise indicated as not being suitable for establishing a network connection. Additionally or alternatively, in some implementations, the alternate network connection can be blacklisted, such that the user device executing process 300 is inhibited from connecting using the alternate network connection. In such implementations, a blacklisted network connection may not be indicated as being an available network connection at 302. In some implementations, a network connection can be blacklisted for any suitable reason. For example, if the performance and/or reliability of a network connection is below a threshold, the network connection can be blacklisted. In some implementations, a network connection can be blacklisted during certain times of day and/or on certain days, but may not be blacklisted for other times and/or days.

In some implementations, the mechanisms described herein can include server-side software, client-side software, server-side hardware, client-side hardware, firmware, or any suitable combination thereof. For example, these mechanisms can encompass a computer program that causes one or more processors (such as hardware processor 212) to execute the mechanisms described herein. For instance, these mechanisms can encompass a computer program written in a programming language recognizable by user device 110 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), random access memory (RAM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some implementations of the disclosed subject matter, the above described steps of the process of FIG. 3 can be executed or performed in any order or sequence not limited to the order and sequence shown and described in the figures. Also, some of the above steps of the process of FIG. 3 can be executed or performed substantially simultaneously where appropriate or in parallel to reduce latency and processing times. Furthermore, it should be noted that FIG. 3 is provided as an example only. At least some of the steps shown in FIG. 3 may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for controlling network connections are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for managing network connections, the method comprising:

connecting, by a user device, to an access point using a first network connection;
determining that a second network connection is available;
determining that the user device is in an idle state;
in response to determining that the user device is in the idle state and in response to determining that the second network connection is available, switching from the first network connection to the second network connection;
monitoring network activity using the second network connection;
subsequent to monitoring the network activity using the second network connection, switching back to the first network connection;
determining, based at least in part on the monitored network activity, whether a threshold amount of network activity has been monitored prior to generating a profile for the second network connection;
in response to determining that the threshold amount of network activity for the second network connection has been monitored, generating the profile for the second network connection based at least in part on the monitored network activity;
comparing the profile for the second network connection to a profile for the first network connection;
selecting the second network connection based on the comparison; and
in response to selecting the second network connection, switching to the second network connection.

2. The method of claim 1, wherein the access point is a dual-band access point, and the first network connection uses a first frequency band to connect to the access point and the second network connection uses a second frequency band to connect to the access point.

3. The method of claim 2, wherein the first frequency band operates at about 2.4 GHz and the second frequency band operates at about 5 GHz.

4. The method of claim 1, wherein the second network connection connects to a second access point.

5. The method of claim 1, wherein monitoring network activity comprises monitoring the number of other user devices connected to the same access point using a network connection corresponding to the second network connection.

6. The method of claim 1, wherein monitoring network activity comprises monitoring for channel changes.

7. A system for managing network connections, the system comprising:
a user device comprising a hardware processor that is programmed to:
connect to an access point using a first network connection;
determine that a second network connection is available;
determine that the user device is in an idle state;
in response to determining that the user device is in the idle state and in response to determining that the second network connection is available, switch from the first network connection to the second network connection;
monitor network activity using the second network connection;
subsequent to monitoring the network activity using the second network connection, switch back to the first network connection;
determine, based at least in part on the monitored network activity, whether a threshold amount of network activity has been monitored prior to generating a profile for the second network connection;
in response to determining that the threshold amount of network activity for the second network connection has been monitored, generate the profile for the second network connection based at least in part on the monitored network activity;
compare the profile for the second network connection to a profile for the first network connection;
select the second network connection based on the comparison; and
in response to selecting the second network connection, switch to the second network connection.

8. The system of claim 7, wherein the access point is a dual-band access point, and the first network connection uses a first frequency band to connect to the access point and the second network connection uses a second frequency band to connect to the access point.

9. The system of claim 8, wherein the first frequency band operates at about 2.4 GHz and the second frequency band operates at about 5 GHz.

10. The system of claim 7, wherein the second network connection connects to a second access point.

11. The system of claim 7, wherein the hardware processor is further programmed to monitor the number of other user devices connected to the same access point using a network connection corresponding to the second network connection.

12. The system of claim 7, wherein the hardware processor is further programmed to monitor for channel changes.

13. A non-transitory computer-readable medium containing computer executable instructions that, when executed by a processor, cause the processor to perform a method for managing network connections, the method comprising:
connecting, by a user device, to an access point using a first network connection;
determining that the user device is in an idle state;
in response to determining that the user device is in the idle state and in response to determining that the second network connection is available, switching from the first network connection to the second network connection;
monitoring network activity using the second network connection;
subsequent to monitoring the network activity using the second network connection, switching back to the first network connection;
determining, based at least in part on the monitored network activity, whether a threshold amount of network activity has been monitored prior to generating a profile for the second network connection;
in response to determining that the threshold amount of network activity for the second network connection has been monitored, generating the profile for the second network connection based at least in part on the monitored network activity;
comparing the profile for the second network connection to a profile for the first network connection;
selecting the second network connection based on the comparison; and
in response to selecting the second network connection, switching to the second network connection.

14. The non-transitory computer-readable medium of claim 13, wherein the access point is a dual-band access point, and the first network connection uses a first frequency band to connect to the access point and the second network connection uses a second frequency band to connect to the access point.

15. The non-transitory computer-readable medium of claim 14, wherein the first frequency band operates at about 2.4 GHz and the second frequency band operates at about 5 GHz.

16. The non-transitory computer-readable medium of claim 13, wherein the second network connection connects to a second access point.

17. The non-transitory computer-readable medium of claim 13, wherein monitoring network activity comprises monitoring the number of other user devices connected to the same access point using a network connection corresponding to the second network connection.

18. The non-transitory computer-readable medium of claim 13, wherein monitoring network activity comprises monitoring for channel changes.

* * * * *